United States Patent
Stein et al.

(10) Patent No.: US 11,341,153 B2
(45) Date of Patent: May 24, 2022

(54) COMPUTERIZED SYSTEM AND METHOD FOR DETERMINING APPLICATIONS ON A DEVICE FOR SERVING MEDIA

(71) Applicant: VERIZON PATENT AND LICENSING INC., Basking Ridge, NJ (US)

(72) Inventors: Robert Stein, New York, NY (US); Tony Ke, New York, NY (US); Vinay Pulim, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 60 days.

(21) Appl. No.: 14/875,048

(22) Filed: Oct. 5, 2015

(65) Prior Publication Data

US 2017/0097969 A1 Apr. 6, 2017

(51) Int. Cl.
| | |
|---|---|
| G06F 17/00 | (2019.01) |
| G06F 16/25 | (2019.01) |
| H04L 67/10 | (2022.01) |
| H04L 67/306 | (2022.01) |
| G06F 16/248 | (2019.01) |
| G06F 16/435 | (2019.01) |
| H04L 65/612 | (2022.01) |
| H04L 67/52 | (2022.01) |

(52) U.S. Cl.
CPC .......... *G06F 16/25* (2019.01); *G06F 16/248* (2019.01); *G06F 16/435* (2019.01); *H04L 65/4084* (2013.01); *H04L 67/10* (2013.01); *H04L 67/18* (2013.01); *H04L 67/306* (2013.01)

(58) Field of Classification Search
CPC ............ H04N 21/4826; H04N 21/4825; G06F 16/25; G06F 16/435; G06F 16/248; H04L 65/4084; H04L 67/10; H04L 67/18; H04L 67/306
See application file for complete search history.

(56) References Cited

U.S. PATENT DOCUMENTS

| | | | | |
|---|---|---|---|---|
| 7,886,072 | B2 * | 2/2011 | Wormington | G06F 16/636 709/245 |
| 8,364,694 | B2 * | 1/2013 | Volkert | G06F 16/438 707/767 |
| 9,813,760 | B2 * | 11/2017 | Wen | H04N 21/8173 |
| 9,854,309 | B2 * | 12/2017 | Odryna | H04N 21/4622 |
| 10,303,715 | B2 * | 5/2019 | Graham | G06F 3/167 |
| 10,534,778 | B2 * | 1/2020 | Chimalamarri | G06Q 20/123 |

(Continued)

*Primary Examiner* — Mohammed H Zuberi

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for determining and recommending media for a user based on applications associated with a user's device. The disclosed systems and methods further provide a deep-linking feature and/or capability, such that upon a user selecting media from the recommended media, the selected media can be automatically rendered via its native application.

17 Claims, 9 Drawing Sheets

(56) References Cited

U.S. PATENT DOCUMENTS

| | | | |
|---|---|---|---|
| 2003/0122877 A1* | 7/2003 | Ravikumar | G06F 3/0482 |
| | | | 715/811 |
| 2011/0125585 A1* | 5/2011 | Dow | G06Q 30/02 |
| | | | 705/14.66 |
| 2012/0278725 A1* | 11/2012 | Gordon | H04N 21/2665 |
| | | | 715/738 |
| 2013/0285937 A1* | 10/2013 | Billings | H04N 21/4725 |
| | | | 345/173 |
| 2014/0157329 A1* | 6/2014 | Roberts | H04N 21/482 |
| | | | 725/61 |
| 2016/0188673 A1* | 6/2016 | Maughan | G06F 16/9535 |
| | | | 707/733 |
| 2016/0357376 A1* | 12/2016 | Carrigan | H04L 67/42 |
| 2017/0048222 A1* | 2/2017 | Wise | H04L 63/08 |
| 2018/0012195 A1* | 1/2018 | Nagaraj | G06Q 10/1095 |

* cited by examiner

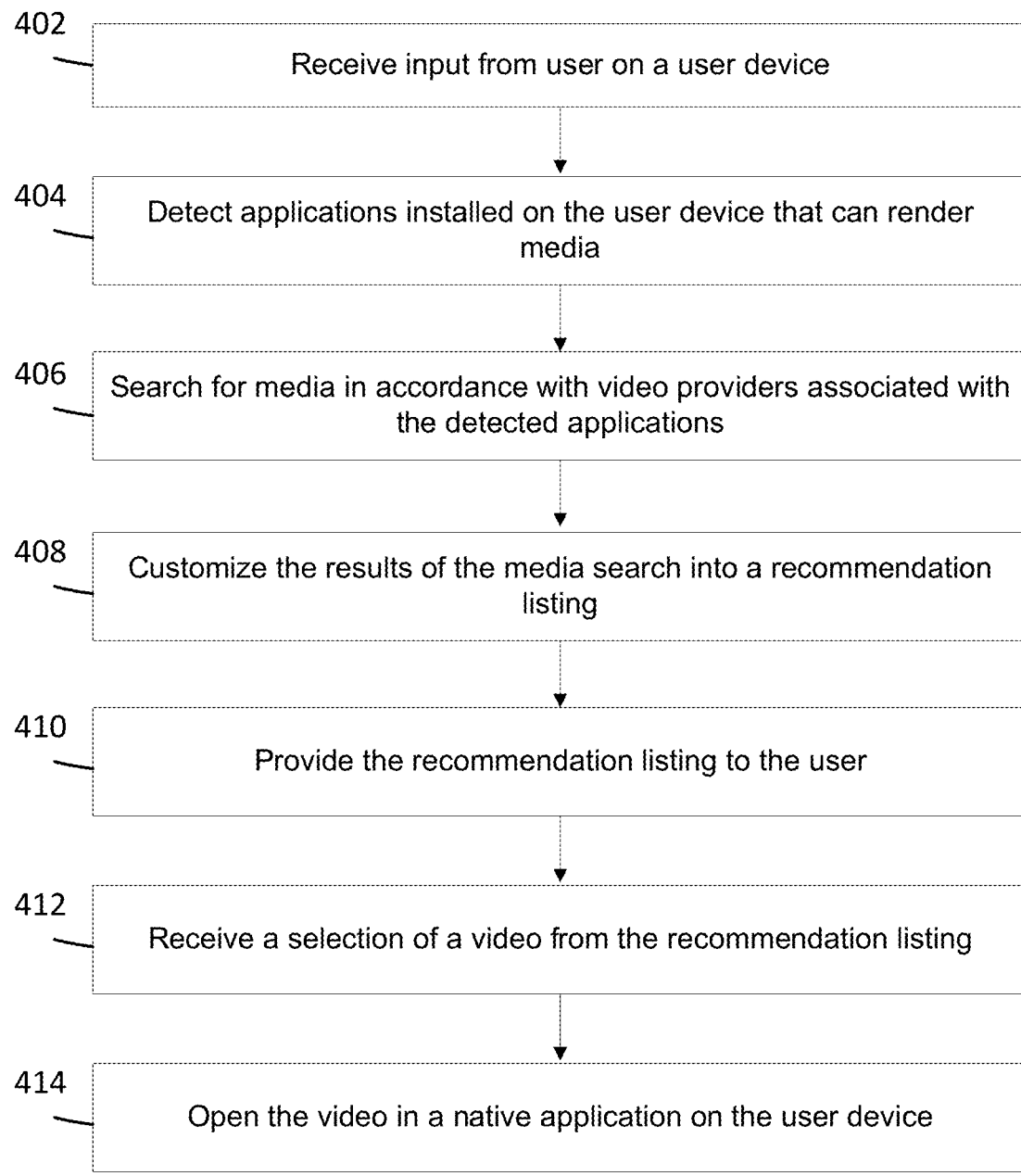

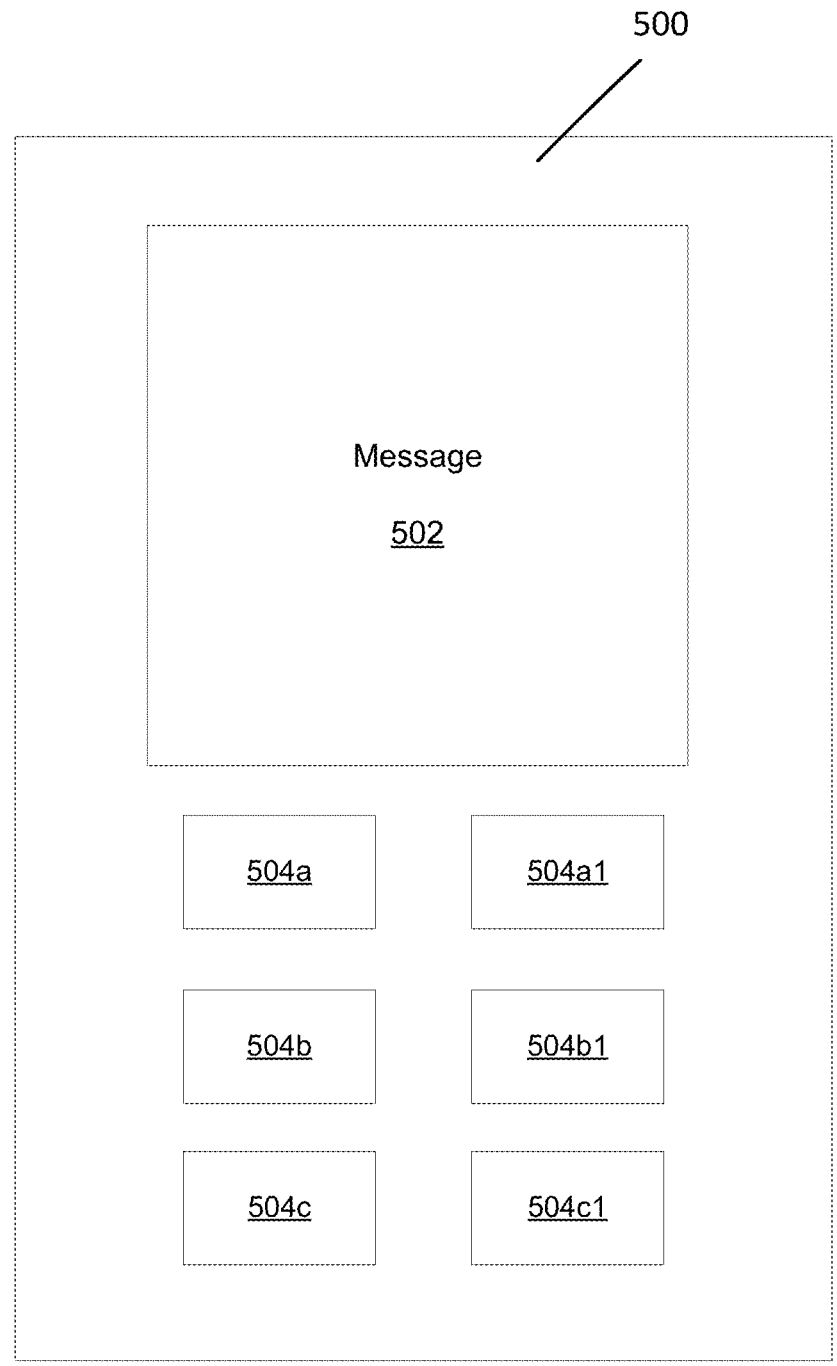

COMPUTERIZED SYSTEM AND METHOD FOR DETERMINING APPLICATIONS ON A DEVICE FOR SERVING MEDIA

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing and/or hosting computer systems and/or platforms by modifying the capabilities and providing non-native functionality to such systems and/or platforms for determining which software applications are available for use on a user's device and delivering media for a user based on such determinations.

SUMMARY

The present disclosure provides systems and methods for improved delivery of media and communication by basing such determinations and communications on the use of information concerning the applications the user has installed and/or executes on his/her device. The disclosed systems and methods leverage information related to applications that are installed and/or applications that execute on a user's device (e.g., web-based applications, or "apps" on mobile devices or tablets, or widgets on smart TVs or set-top boxes) in order to provide media recommendations to the user. The disclosed systems and methods further provide a deep-linking feature and/or capability, such that upon a user selecting media from the recommended media, the selected media can be automatically rendered via its native application installed on the user's device as detected by the detection capability.

It will be recognized from the disclosure herein that embodiments of the instant disclosure provide improvements to a number of technology areas, for example those related to systems and processes that handle or process video recommendations, such as but not limited to, search engines, local and/or web-based applications, TV widgets, set-top boxes, or other types of media rendering or recommendation platforms, electronic social networking platforms and the like. The disclosed systems and methods can effectuate increased speed and efficiency in the ways that users can access new media content, in addition to an increased contextual relevancy per user regarding the media provided to a user, thereby reducing user effort, as the disclosed systems and methods, inter alia, reduce the amount of required input for a user that is searching for media to view. Users will be provided a more fluid and personalized experience through the disclosed systems and methods leveraging of information present on the user's device which will enable the user to avoid having to provide all, if any, desired/requested information regarding the capabilities of the device being used to render media.

In accordance with one or more embodiments, a method is disclosed which includes detecting, via a first application executing on a computing device of a user, application information associated with the computing device, the application information comprising an identification of applications installed on the computing device and information indicating media providers associated with each detected application; communicating, via the first application executing on the computing device, a search request for a media listing based on the application information, the search request comprising an identifier of the user in order to obtain media information associated with the user that is associated with each media provider; receiving, at the computing device, a search result comprising information from each media provider, the search result comprising media information associated with the user; analyzing, via the first application executing on the computing device, the search result to determine an order of the received media information, the analysis comprising compiling the received media information into an ordered media item presentation; creating, via the first application executing on the computing device, a customized user interface (UI) specific to the first application; and displaying, via the first application executing on the computing device, the media item presentation within a first portion of the customized UI.

In accordance with one or more embodiments, a method is disclosed which includes receiving, at a computing device over a network, a first search request for media content, the search request comprising information identifying a user and application information associated with device of the user, the application information comprising a set of applications installed on the user device and information indicating media providers associated with each application in the set; communicating, via the computing device, a second search request to each media provider, the search request comprising the user information; receiving, at the computing device over the network, in response to the search request, a search result comprising a media listing from each media provider, the media listing comprising media information for media that is renderable by each of the applications in the set; communicating, via the computing device over the network, the media listing to a user for display on the user device; and facilitating rendering, via the computing device, media associated with a media item identified in the media listing, the media item being selected by the user and rendered in an application identified in the set.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for determining and recommending media for a user based on applications associated with a user's device.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are

FIG. 4 is a flowchart illustrating steps performed in accordance with some embodiments of the present disclosure;

FIGS. 5A-5C illustrate non-limiting examples of user interfaces in accordance with some embodiments of the present disclosure;

DESCRIPTION OF EMBODIMENTS

Figure 1:
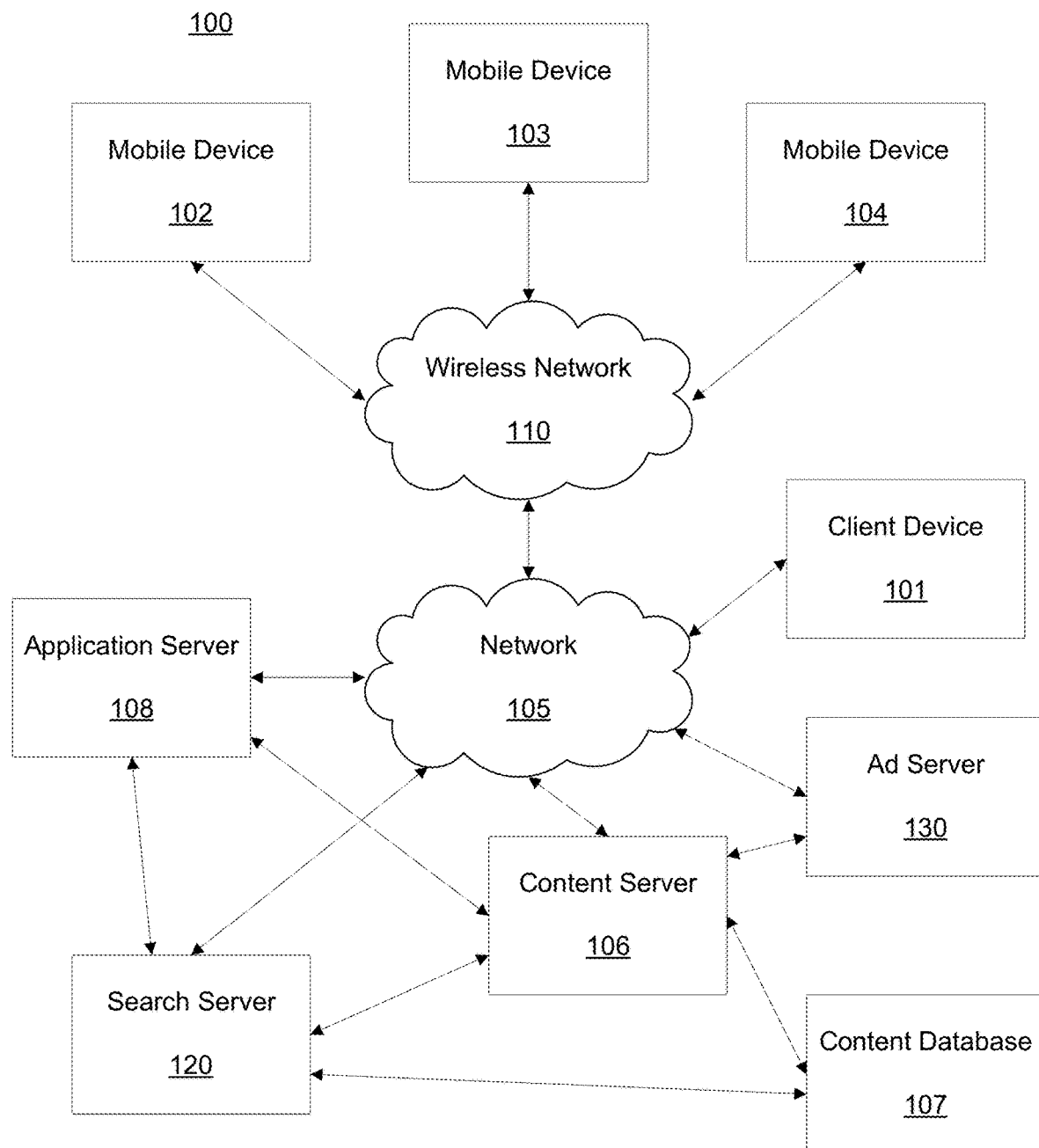
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, conventional techniques for users to search for and discover media involves a user manually selecting specific applications associated with media services and manually searching those services to identify media to render. For example, if a user desires to play a video provided by HBO®, the user needs to open the HBO Go® (or HBO Now®) application on his/her device and then search for the desired video. Similarly, if the user desires to view a video specifically provided/hosted by Hulu® or Netflix®, the user must open the associated Hulu® or Netflix® application on his/her device and perform a search for the video.

The disclosed systems and methods provide improved systems and methods that enable a user to discover media by leveraging the knowledge of which applications are associated with the user's device and are capable of rendering media. "Associated applications," as referenced within this disclosure, refers to any known or to be known application that can be used to stream, download and/or otherwise render media. For example, applications associated with services provided by Netflix®, Hulu®, Amazon Prime®, YouTube®, Vevo®, HBO®, ShowTime®, to name a few, are the types of applications being leveraged by the disclosed systems and methods to identify and recommend media. Such applications can be installed on a user device and/or executed on the user's device (e.g., a smart phone, tablet or phablet, set-top box or smart TV) or can be web-based applications that are accessible over a network, but function in a similar manner as those applications installed once they are accessed. That is, the applications (e.g., "associated applications) that form the basis for recommended media content can include, but are not limited to, downloaded and installed applications, cloud-based applications that execute over a network on the user's device, applications executing on a connected or tethered device to the user's device (e.g., a smart watch paired with a smart phone), applications purchased and residing in a user's local or cloud storage (e.g., an application that was downloaded and stored in a user's iTunes® or iCloud® library, where the application may or may not be currently installed on the user's device), and the like.

For purposes of this application, reference will be made to applications that are installed on a user's device—and will be referred to in some embodiments as "media applications"; however, one of ordinary skill in the art will recognize that any type of application or "app" can be an "associated application," whether known or to be known, and can be utilized by the disclosed systems and methods without departing from the scope of the instant disclosure.

The disclosed systems and methods can be implemented for any type of content item, including, but not limited to, video, audio, images, text, and/or any other type of multimedia content. While the discussion herein will focus on video content items, it should not be construed as limiting, as any type of content or multimedia content, whether known or to be known, can be utilized without departing from the scope of the instant disclosure.

As discussed herein, the disclosed systems and methods automatically detect media applications that are installed on a user's device. Based on such detection, video recommendations are compiled and provided to the user. Thus, the present disclosure's advanced capabilities of automatically detecting streaming and/or video services currently available to a user's device enables the disclosed systems and methods to automatically identify and recommend video content from such services that the user can playback on his/her device. Such playback can be effectuated through the video's native application. According to embodiments of the present disclosure, this playback is a predicated on a deep-linking feature(s) or capability provided by the disclosed systems and methods. That is, upon selecting a video from a recommendation listing, a deep-link associated with such video automatically transitions the user from the application used to recommend the video to the application that is to be used to render the video (i.e., the application associated with the service that hosts/provides the video).

The disclosed systems and methods provide non-native and improved functionality to computing devices and content hosting and providing platforms by providing the novel ability of accessing and rendering media from a plurality of remote media repositories associated with media provides (e.g., Netflix®, Hulu®, Amazon®, and the like) from within a single application. The instant disclosure provides novel systems and methods rooted in computer technology for overcoming a problem specifically arising in the realm of computer networks. That is, currently, in order for a user to determine what media to consume, access and render from multiple remote locations over a network, the user must open separate applications in order to see what is recommended via access to each location's trove of media. Through implementation of the features of the instant disclosure, the disclosed systems and methods provides the novel capability for a user to determine what is recommended on multiple sites, and then seek to access and render the remotely located media, from a single application executing on the user's device, via a single navigable interface, thus providing a uniform user experience in a single app while accessing and using information from multiple sources with different user experiences.

As discussed herein, the disclosed systems and methods determine which applications are installed on a user's device and then identify which media providers are associated therewith. With this knowledge, the systems and methods then perform a search, including an identification of the requesting user, for media provided by each media provider. Using the search result from the multiple providers, information about available and recommended media for that specific user is reformatted into a customized format whereby the results from disparate services in different formats is presented as a single set of results within the single user interface of the application. Upon selection by the user, the application then, via inter alia a deep linking feature, executes instructions that automatically trigger the opening of the selected media in an application that is not only installed on the user's device, but also is associated with the media provider that hosts such media. Thus, the disclosed subject matter of the instant disclosure provides a computerized solution rooted in computer technology for providing an application with a single user experience that can access and render media from multiple providers that are conventionally only accessible via separate applications associated with such providers with differing user experiences.

According to some embodiments, the disclosed systems and methods can be embodied as a stand-alone application that executes on a user device. In some embodiments, the disclosed systems and methods can function as an application installed on the user's device, and in some embodiments, such application can be a web-based application accessed by the user device over a network. In some embodiments, such application can be installed as an augmenting script, program or application to another media application (e.g., Yahoo!® Video, Netflix®, Hulu®, and the like). For purposes of this disclosure, the application performing the disclosed systems and methods will be referenced as an installed application on the user's device, referred to as "the Video Guide Application"; however, it should not be construed as limiting, as those of skill in the art will recognize that it does not only apply to video and also that embodiments exist where the Video Guide Application can be a remotely located application, whether it is located on a network and executable over such network, or located on a tethered or connected device and executed through the pairing of such devices.

As discussed in more detail below at least in relation to FIG. 6, according to some embodiments, information associated with or derived from recommended media, selected and/or rendered media, and/or information associated with the applications associated with a user device and/or used to render recommended media, as discussed herein, can be used for monetization purposes and targeted advertising when providing, delivering or enabling access to the recommended/selected media. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., Netflix®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
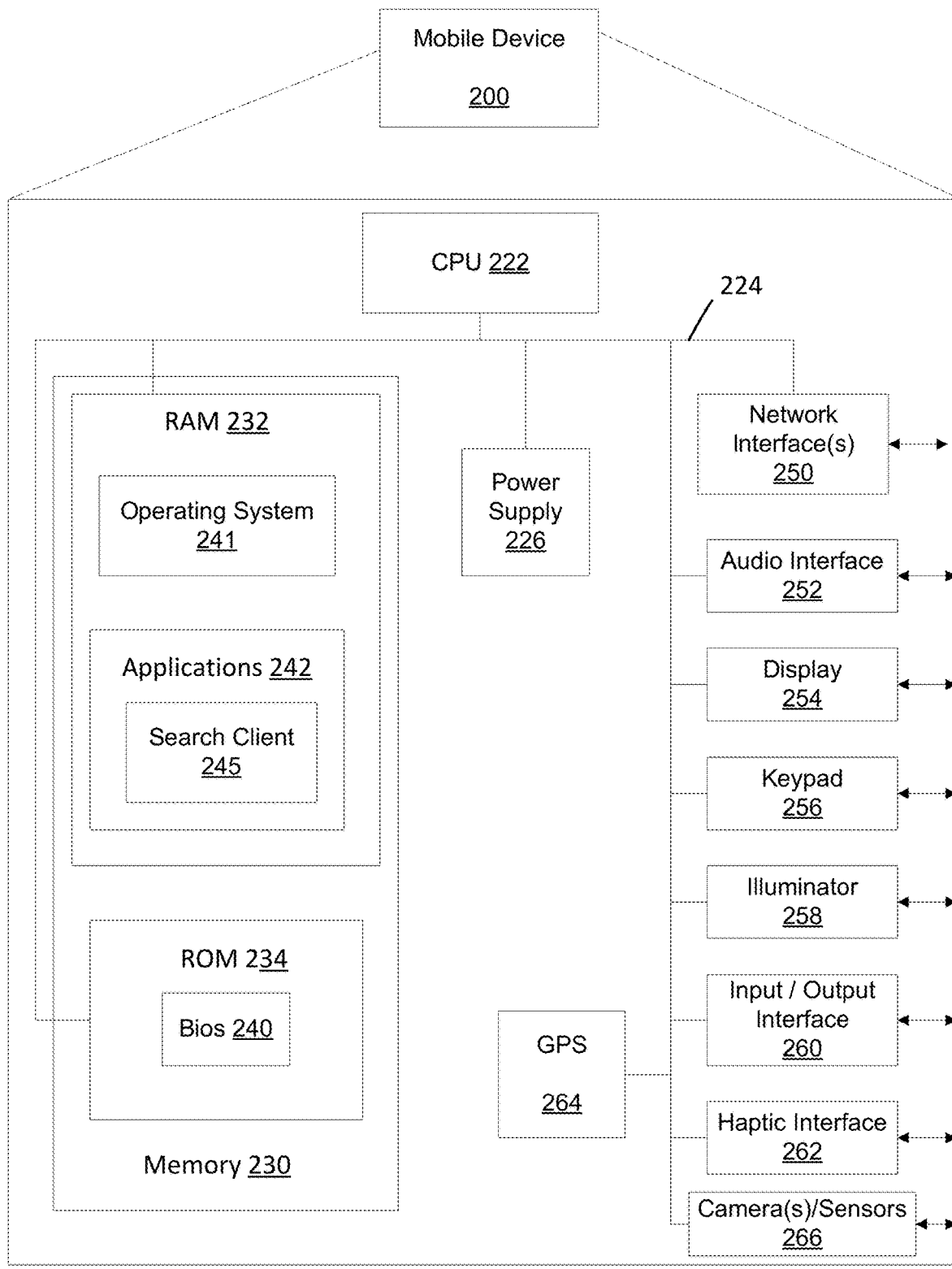
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
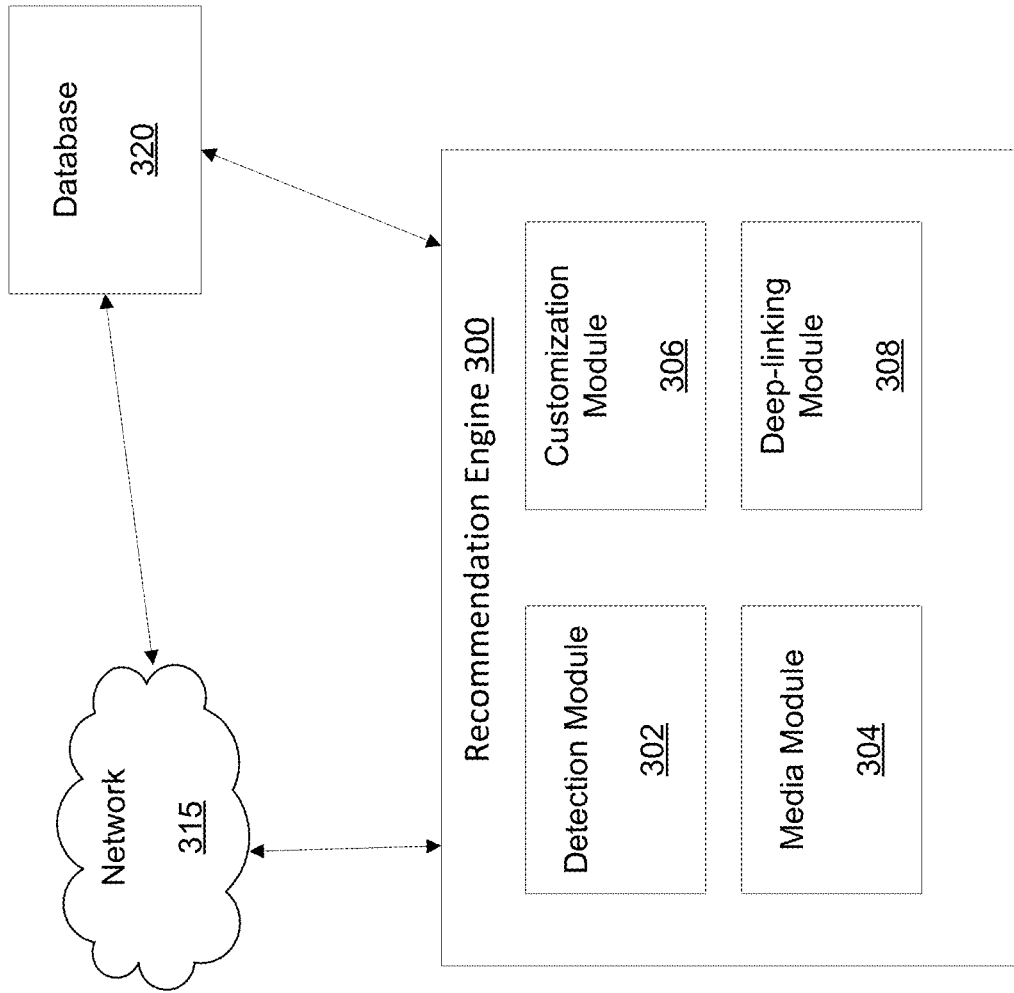
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a recommendation engine 300, network 315 and database 320. The recommendation engine 300 can be a special purpose machine or processor and could be hosted by an application server, content server, social networking server, web server, search server, content provider, email service provider, ad server, user's computing device, and the like, or any combination thereof.

According to some embodiments, recommendation engine 300 can be embodied as a stand-alone application that executes on a user device such as the Video Guide Application. In some embodiments, the recommendation engine 300 can function as an application installed on the user's device, and in some embodiments, such application can be a web-based application accessed by the user device over a network. In some embodiments, the recommendation engine 300 can be installed as an augmenting script, program or application to another media application (e.g., Yahoo!® Video, Netflix®, Hulu®, and the like).

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 comprises a dataset of data and metadata associated with local and/or network information related to users, services, applications, content (e.g., video) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes rendering and/or delivering videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 comprises information associated with media applications that are installed on a user's device that have functionality for streaming, downloading and/or otherwise rendering media, such as the "media applications" as discussed above. Application information can include, but is not limited to, data (and metadata) indicating the identity (e.g., identifier) of an installed application on the user's device, the identity of a web-based application executing or executed by the device, temporal information indicating when such applications were installed, last opened (or executed) and/or closed, and information indicating the user's activity performed in connection with such applications. Such information can be derived and stored in database 320 based on information identified from a device's registry, program log, and the like, as well as from a user profile detailing a user's downloads, activity history and the like.

For purposes of the present disclosure, as discussed above, videos (which are stored and located in database 320) as a whole are discussed within some embodiments; however, it should not be construed to limit the applications of the systems and methods discussed herein. That is, while reference is made throughout the instant disclosure to videos (e.g., video clips, movies, music videos, TV shows, YouTube® videos, Instagram® videos, Vine™ videos, and/or any other type of streaming or downloadable video content), other forms of user generated content and associated information, including for example text, audio, multimedia, RSS feed information can be used without departing from the scope of the instant application, which can thereby be communicated and/or accessed and processed by the recommendation engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the recommendation engine 300, and the database of stored resources 320. Indeed, as illustrated in FIG. 3, the recommendation engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as recommendation engine 300, and includes detection module 302, media module 304, customization module 306 and deep-linking module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the recommendation engine 300 (e.g., application information, and/or recommended and/or selected media) can be supplied to the database 320 in order to ensure that the information housed in the database 320 is up-to-date as the disclosed systems and methods leverage real-time information and/or behavior associated with the user and/or the user's device, as discussed in more detail below.

Turning to FIG. 4, Process 400 details steps performed in accordance with exemplary embodiments of the present disclosure for determining and providing media recommendations to a user based on application information associated with a user's device (e.g., applications installed on a user's device).

Process 400 beings with Step 402 where a user provides an input on the user's device to open the Video Guide Application. In some embodiments, the user input can be a refresh of the Video Guide Application. As discussed above, the Video Guide Application is an application that is installed on (or otherwise executing on or in communication with) the user's device that can provide video recommendations to the user of such device. As mentioned above and discussed in the following steps of Process 400, the Video Guide Application, embodied as the recommendation engine 300, can identify media applications installed on a user's device and provide recommendations of video content to the user in line with those identified media applications.

According to some embodiments, Step 402 also involves identifying an identifier (ID) of the user and/or user device, which is utilized for purposes of the media search discussed below. In some embodiments, this may not be necessary as the Video Guide Application is a resident application of the user's device; therefore it has the user's information already associated therewith, such as user profile information and/or any other type of stored user data, as discussed above in relation to the discussion of database 320.

In Step 404, after the Video Guide Application is opened, or during the opening process or sequence of the Video Guide Application, a detection is made regarding which applications from which content providers are installed on the user device that are capable of rendering media. That is, a determination is made as to the identity of applications installed on the user's device that are able to stream, download or otherwise render video content. This determination can be based on the detection module 302 parsing the registry of the user's device (or program log) and identifying those applications installed on the user device. In some embodiments, a determination can be made regarding, for example, each applications type, the provider/service associated with each application, which operating system the applications are running on, and/or which type of content each application can render, and the like, or some combination thereof. That is, for example, in some embodiments, Step 404 involves a determination as to the identity of the provider associated with each installed application. Such determination can involve analyzing the application information of the installed applications and identifying information indicating the identity of the provider of the installed applications. For example, upon determining that an application is installed, Step 404 can further analyze the registry or program log of the user device to identify information that indicates that the application is provided by the service Netflix®. In some embodiments the information about installed applications can be provided or obtained by accessing or querying a utility on the device itself and made available via an API by the device provider. Once detected or obtained, the system uses the information detected in further extracting recommendation information from the content providers whose applications have been detected, as described further below.

In Step 406 the information detected from Step 404 is communicated over a network as a search request for media recommendations from the content providers associated with the installed applications. That is, a search for media based on the detected applications is performed. In some embodiments, the search request is communicated over a network to each identified content provider associated with the installed applications. In some embodiments, the search is communicated to a server and/or database that is associated with and/or hosts or provides the recommendation engine 300 (e.g., Yahoo!® server and/or database 320). In such embodiments, the server and/or database comprise the data and/or metadata which forms the result of the search, where such data and/or metadata can be provided by and/or associated with third party media providers. The search request comprises information indicating the applications that were detected in Step 404 and information identifying the user to the various content providers whose applications were detected on the device. The information comprised in the search request can include, but is not limited to, an identifier of the user or user device, an identifier of an application, information indicating the provider/service associated with an application, a type of application, type of content renderable via an application, the operating system an application can run on, a version of an application, and the like. Step 406 can be performed by the media module 304.

According to some embodiments, Step 406 involves searching for media for a user, where the search is associated with each of the providers/services associated with the installed media applications. In some embodiments, the search is communicated directly from the user device to each content provider. In such embodiments, the communicated search request comprises identifying information of the user (or user device) (e.g., user ID) which is then utilized to identify media from each provider. In some embodiments, the search involves providing a server associated with a service provider (e.g., Yahoo!®) with the user information (e.g., user ID) and information of each application on the user's device. The server then parses the search request in order to identify the application information and determine which video provider (e.g., local or third party provider/service) is associated with the identified application(s). In some embodiments, the server then can search an associated database (e.g., database 320) for data and metadata associated with the video provider(s). In some embodiments, the parsing and determination of the provider associated with applications can be performed at the user device and/or may be included in the application information detected in Step 404. According to some embodiments, the search can involve the application of any known or to be known machine learning algorithm, computational analysis, statistical analysis or technology, such as, but not limited to, vector analysis, cluster analysis, data mining, Bayesian network analysis, Hidden Markov models, artificial neural network analysis, logical model and/or tree analysis, and the like, in order to identify relevant or desired video from each provider.

Thus, as a result of this search, the media associated with each identified application is identified, where the media is provided by the service determined to be associated with the application. For example, if a Netflix® application is determined to be installed on the user's device, the search of Step 406 involves searching the media repository associated with Netflix's streaming services (which are renderable via the Netflix® application installed on the user's device). Additionally, continuing with the example, if a Hulu® application is also detected on the user's device, the search of Step 406 additionally involves searching the media repository associated with Hulu's streaming services (which are renderable via the Hulu® application installed on the user's device) for media determined to be of interest to the user (based on the user ID).

According to some embodiments, the search performed in Step 406 may also include, or be based on, additional factors associated with user. Such factors can include, but are not limited to, the location of the user, the time of the request (or time of the input from Step 402), behavioral information of the user, demographic information of the user, and/or any stored user data as discussed above. For example, Step 406 can include an embodiment where a determination is made that it is Sunday Night and user Jim typically watches movies on Sunday Night after 8 pm, then the search may focus solely on movies rather than movies and TV shows. This added feature can provide improved accuracy and relevancy for a media search request.

According to some embodiments, Steps 404 and/or 406 may be performed periodically according to a preset time period, which can be set by a user, by the Video Application Guide, by a system administrator, by settings associated with the device, according to capabilities of the user's device, based on account privileges and/or capabilities of a user's account, and the like, or some combination thereof. Therefore, for example, if the Video Application Guide is open, yet operating in the background of the user's device, installed applications can be detected and a search can be performed in the background, where such results can be cached on the user's device. Thus, should the user toggle over to the Video Application Guide UI, or select the application for a "refresh", the application can have results ready of the user's viewing, thereby increasing the efficiency and productivity of the Video Application Guide.

In Step 408, the results of the media search are customized according to information associated with the user. In some embodiments, the results of the media search are also customized according to capabilities of the user device. Such customization, which is performed by the customization module 306, is based on the stored user data and identified application information. The customization can involve determining which videos to recommend to the user from those videos identified from the search performed in Step 406. The customization can also involve ranking and/or prioritizing videos identified from the search of Step 406 based on preferences associated with the user. Such preferences can be local to the Video Application Guide or can be identified (or retrieved) during the search in Step 406.

According to some embodiments, the customization can be based on preferences set by the user on each service (for example, ratings set by a user on videos on YouTube® and ratings and/or tags applied to media provided by Netflix®). In some embodiments, the customization of the search results can be based on additional or alternative factors including, but not limited to, popularity of videos, quality of videos, recency, and the like. Such factors can be derived from information provided by the user, the Video Guide Applications' hosting service provider (i.e., Yahoo!®), by the service providers associated with the media applications (e.g., Netflix®, Hulu®, YouTube®), or by other third party services (e.g., rottentomatoes.com, IMDB™, and the like), or some combination thereof.

By way of a non-limiting example, user James has installed on his phone applications for Netflix® and HBO®. The search of Step 406 is performed respective to, for example, a Yahoo!® repository that comprises information from Netflix and HBO. The search has identified 3 movies from Netflix that James has marked as "watch later" and 2 movies from HBO that James has added to his "watch list". Thus, there are a total of 5 movies compiled from the two services that are respectively "top ranked" by the user. The customization in Step 408 can determine which movie to prioritize; that is, Step 408's customization can involve ranking the search results despite the results being provided from different sources with different initial rankings.

For example, Step 408 can determine the popularity of all 5 videos identified in the above example, and order them according to those videos having the highest popularity. In another example, the movies that are more recently released to streaming media may be ranked atop the listing from those that have been out longer. As such, it should be understood that the customization step 408 involves compiling a ranked or ordered set of search results.

Thus, Step 408 involves compiling the information obtained from the search into a recommendation listing for the user. This recommendation listing comprises a compilation of video information identified from the search, which spans all the application provider's databases. In some embodiments, the recommendation listing may only including video information from a single provider associated with a media application; and in some embodiments, the recommendation listing may include videos from a plurality of providers. In some embodiments, Step 408 can further or alternatively comprise customizing (by the customization module 306) the recommendation listing to include only the videos that are available from all of (or a predetermined number of) the video providers associated with the identified media applications. The number of video providers providing video for the recommendation listing can be set by the user, by the Video Guide Application, an administrator, according to settings of each source provider, according to data and/or bandwidth parameters associated with the user's accounts, user device and/or user's data plans, and the like, or some combination thereof.

Step 410 involves providing the customized search results to the user (i.e., recommendation listing). Step 410 can be performed by the customization module 306. Step 410 can involve displaying an icon or any other type of known or to be known graphical user interface object to the user within the Video Guide Application. In some embodiments, the recommendation listing can comprise icons depicting cover art associated with each video, and in some embodiments, the icons can depict looping videos (or videos in graphics interchange format (GIF)), and the like. In some embodiments, the listing can comprise a title and/or description of the video, and/or can include user reviews.

Figure 5B:
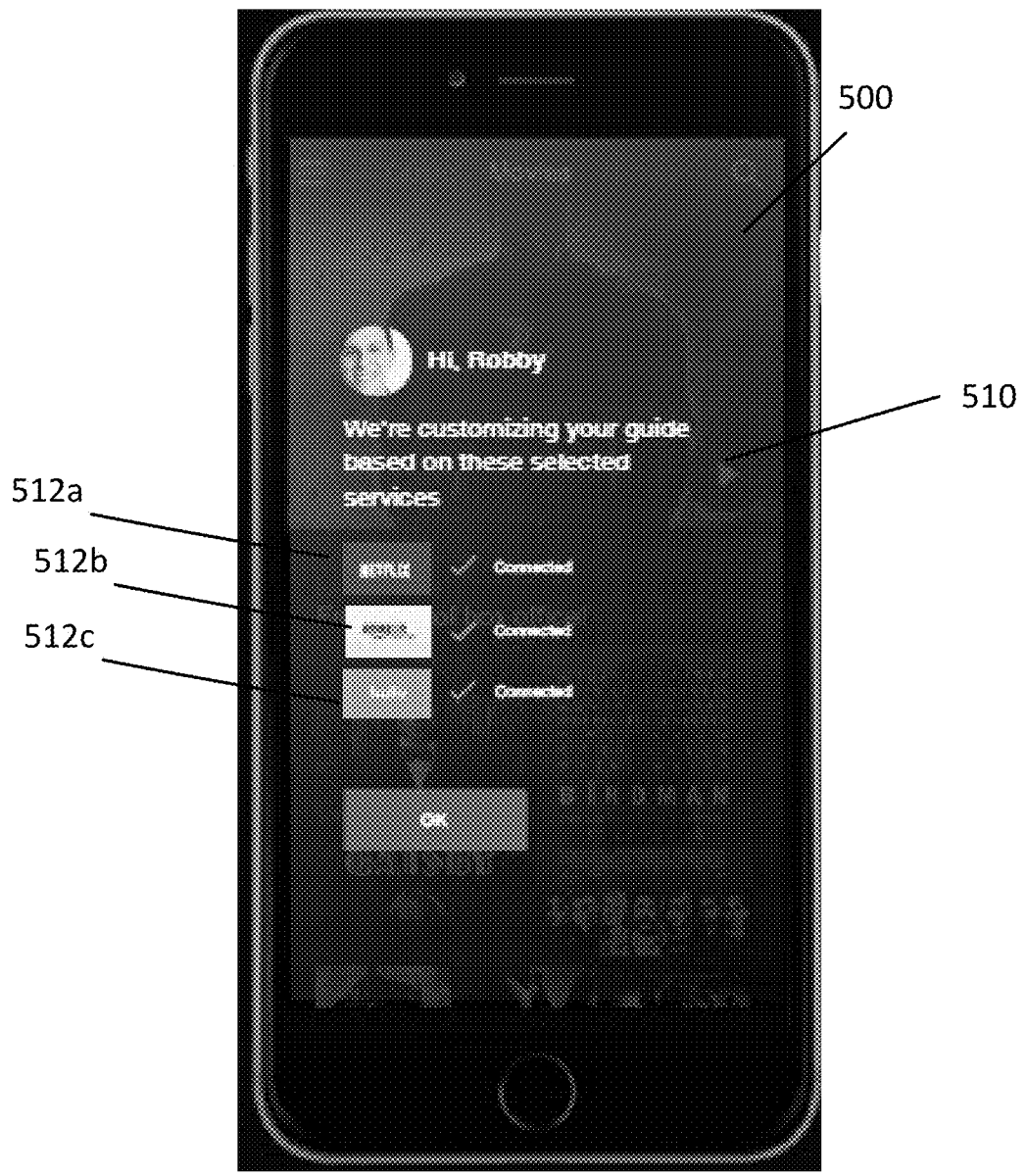

By way of a non-limiting example, as illustrated in FIGS. 5A and 5B, user Bob has installed on his user device three media applications, illustrated as items 504a, 504b and 504c. FIG. 5A provides an overview of a non-limiting UI example and FIG. 5B provides an exemplary of the UI in FIG. 5A. For example, such applications can be Netflix® (item 504a in FIG. 5A and item 512a in FIG. 5B), Amazon® (item 504b in FIG. 5A and item 512b in FIG. 5B) and Hulu® (item 504c in FIG. 5A and item 512c in FIG. 5B). As in Step 402, the user opens on his user device the Video Guide Application 500. During or immediately after opening (Step 402) the Video Guide Application 500, application 500 determines that items 504a-504c (and items 512a-512c) are installed on Bob's device (Step 404).

In some embodiments, the opening process of the Video Guide Application 500 can involve a displayed message 502 to the user, such as, for example: "Hi Robby. We are customizing your guide based on these selected services."—as illustrated in item 510 of FIG. 5B. This message 502/510 provides an indication that Step 404 is occurring and/or has occurred whereby items 504a-504c/512a-512c are displayed (as icons or buttons) which detail the detected (or discovered) applications resident on Bob's device. In some embodiments, items 504a1, 504b1 and 504c1 may be displayed. Such items, which can be displayed respective to 504a, 504b and 504c, respectively, provide an indication that the Video Guide Application 500 has successfully accessed and/or identified those applications as media applications, which is illustrated in FIG. 5B through the "check mark" next to the word "connected" (displayed adjacent to buttons 512a-512c).

Continuing with the example, the information associated with the identified applications 504a-504c/512a-512c is utilized as a basis for a search for media that is associated with those applications. That is, a search is performed in order to identify video that is renderable by the identified media applications. This search is performed for each video provider associated with the identified media applications with reference to the identity of the user. That is, each video provider is searched for content that is determined to be relevant to the user, and or has been identified by the user (e.g., tagged or bookmarked).

For example, with regard to application 504a/512a, a search can be performed by communicating with the Netflix® service or datastore that houses the video content for Netflix®. The search first identifies the user—user Bob—then identifies the content determined to be relevant to user Bob. For example, this can entail identifying the most recently added and/or most popular vides on Netflix®. In another example, this can also or alternatively involve identifying the video "tagged" by Bob to watch later. In a similar manner, a search respective to the video providers associated with applications 504b and 504c (i.e., Amazon® and Hulu®, respectively, as illustrated as items 512b and 512c) can be performed in accordance with those steps outlined for application 504a/512a.

Figure 5C:
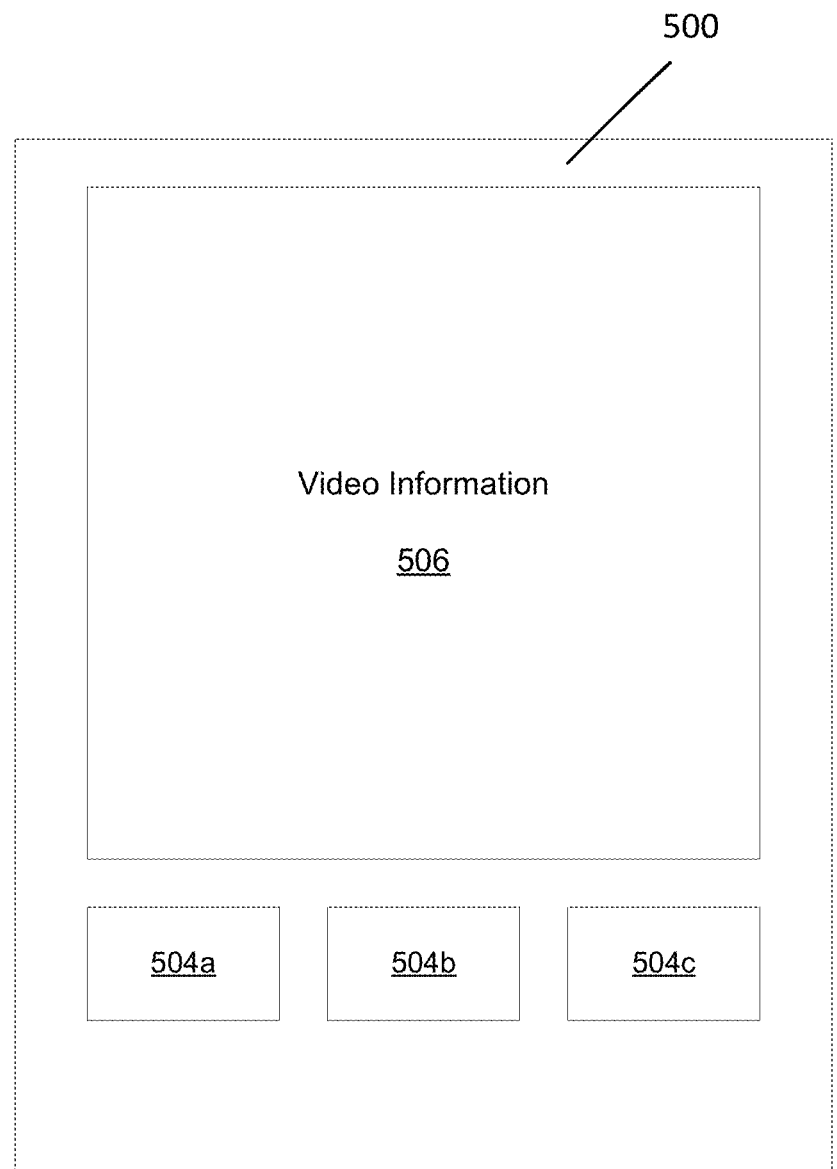

Continuing with Process 400, Step 412 involves receiving a selection from the user to view a video identified within the recommendation listing (from Step 410). In some embodiments, as illustrated in FIG. 5C, the selection can involve viewing, within the Video Guide Application 500, video information 506 about the video, which can include, but is not limited to, cover art for the video, as well as information indicating the cast, directors, reviews, synopsis of the video, and the like, or some combination thereof. In Step 414 (or alternatively as a result of the selection in Step 412), the video can be opened in a native application on the user device, where the native application is one of the media applications detected in Step 404. The opening of the video in one of the media applications can be performed by the deep-linking module 308. As illustrated in FIG. 5C, items 504a-504c are again displayed as buttons and provide indications that the video can be rendered by those media applications. Therefore, if the user selects one of those buttons (items 504a-504c), the Video Application Guide 500 will instruct the user device to not only open the associated media application, but also open and begin rendering the selected video in such media application.

For example, continuing with the above example and now in connection with FIG. 5C, user Bob has been provided the recommendation listing that includes the movie "Birdman". Upon selecting the video (Step 412), he is presented with information about the video (item 506). He is also presented within the Video Guide Application 500 with buttons that are labeled with the detected media applications (from Step 404)—items 504a-504c. Upon Bob clicking, selecting or otherwise providing input respective to one of the buttons 504a-504c, the application associated with the identified button will automatically open and the "Birdman" movie will begin playing automatically via a deep-linking feature applied to each button. For example, if Bob selects the button 504a, which is associated with Netflix® streaming media services, then the Netflix® application installed on his device will automatically open (via instructions sent by the Video Guide Application to the registry and/or program log, or other process used to trigger an application's initiation) and the Netflix® application will be instructed to automatically play the "Birdman" movie.

According to some embodiments of the present disclosure, information associated with the detected applications, customized recommendation listing, selections by a user, and the like, as discussed above in relation to Process 400, can be fed back to the recommendation engine 300 for modeling (or training) of the information stored in database 320 via iterative or recursive bootstrapping or aggregation functionality. This can improve the accuracy of the identification of media recommendations presented to a specific user and/or other users on a network. Embodiments of the present disclosure involve the recommendation engine 300 applying such recursive/bootstrapping functions utilizing any known or to be known open source and/or commercial software machine learning algorithm, technique or technology.

Figure 6:
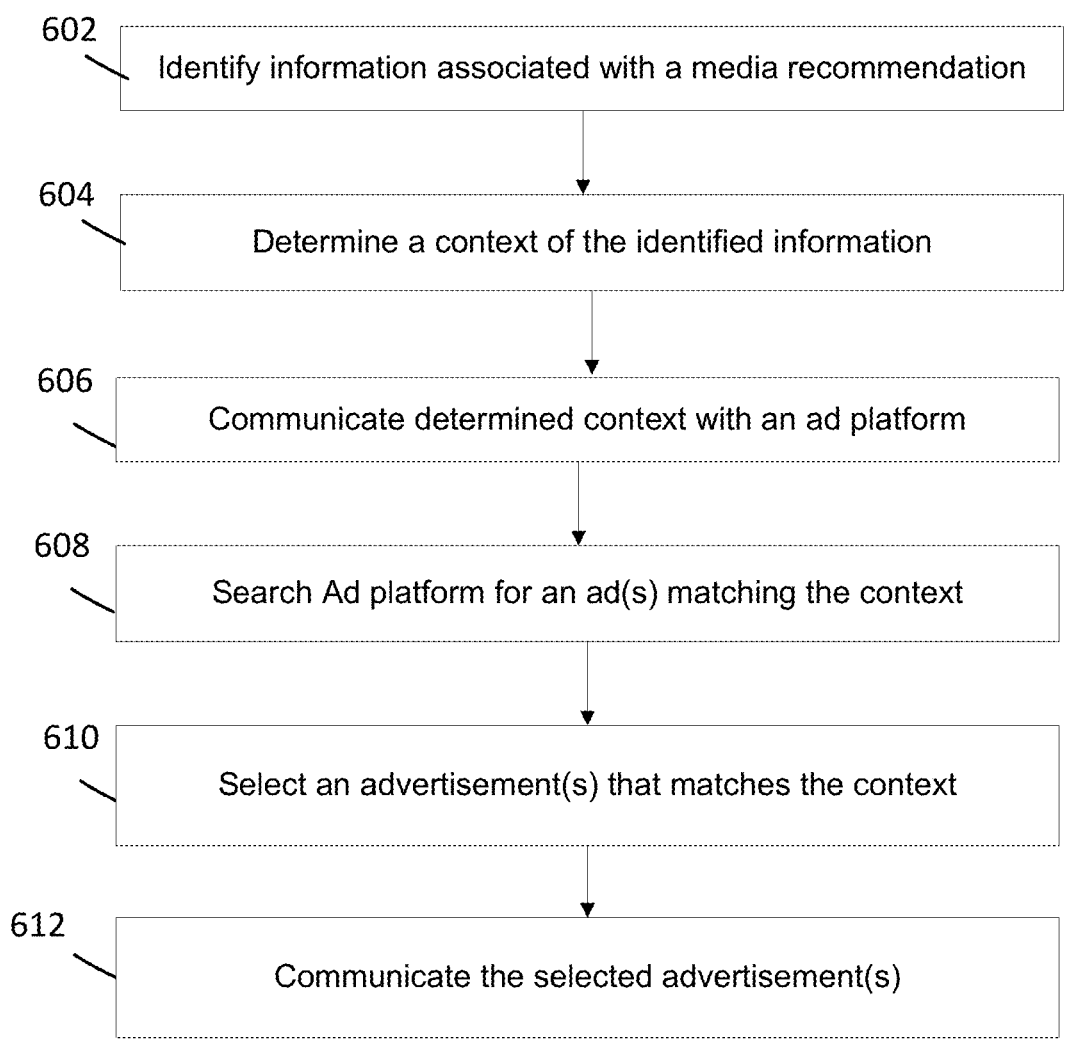
FIG. 6 is a flowchart illustrating steps performed in accordance with some embodiments of the present disclosure.

FIG. 6 is a work flow example 600 for serving relevant digital content associated with advertisements (e.g., advertisement content) based on the information associated with the media recommendation, as discussed above in relation to FIGS. 4-5C. Such information, referred to as "recommendation information" for reference purposes only, can include, but is not limited to, the identity of the application the user renders the recommended media in (e.g., via the deep linking capabilities discussed above), the identity of the applications determined to be associated with the user device, the type of media content being rendered, the content of such media, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

By way of a non-limiting example, work flow 600 includes a user being recommended media associated with the Netflix® show "House of Cards". Based on information related to the determination that the Netflix® application is installed on the user's device, for example, the user may be provided with ad content related to special benefits Netflix® users can receive, such as a free promotional month of Netflix® service. In another example, the user may be provided with coupons for purchasing the shows recent season on DVD based on the determined content of the rendered video, or be offered ads from competing services.

In Step 602, recommendation information associated with the media recommendation is identified. As discussed above, the recommendation information can be based on the recommendation process outlined above with respect to FIGS. 3-5C. For purposes of this disclosure, Process 600 will refer to single media recommendation as the basis for serving an advertisement(s); however, it should not be construed as limiting, as any number of recommendations, and/or quantities of information related to applications on a user device and/or media renderable via such applications can form such basis, without departing from the scope of the instant disclosure.

In Step 604, a context is determined based on the identified recommendation information. This context forms a basis for serving advertisements related to the recommendation information. In some embodiments, the context can be determined by determining a category which the recommendation information of Step 602 represents. For example, the category can be related to the type of application used to render the media, and/or can be related to the content type of the media being rendered. In some embodiments, the identification of the context from Step 604 can occur before, during and/or after the analysis detailed above with respect to Process 400, or some combination thereof.

In Step 606, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 608, the advertisement server 130 searches the ad database for an advertisement(s) that matches the identified context. In Step 610, an advertisement is selected (or retrieved) based on the results of Step 608. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to render the media (e.g., Netflix® from the above example). Step 612. In some embodiments, the selected advertisement is sent directly to each user's computing device. In some embodiments, the selected advertisement is displayed in conjunction with the rendered and/or recommended media on the user's device and/or within the application being used to recommend and/or render the media.

Figure 7:
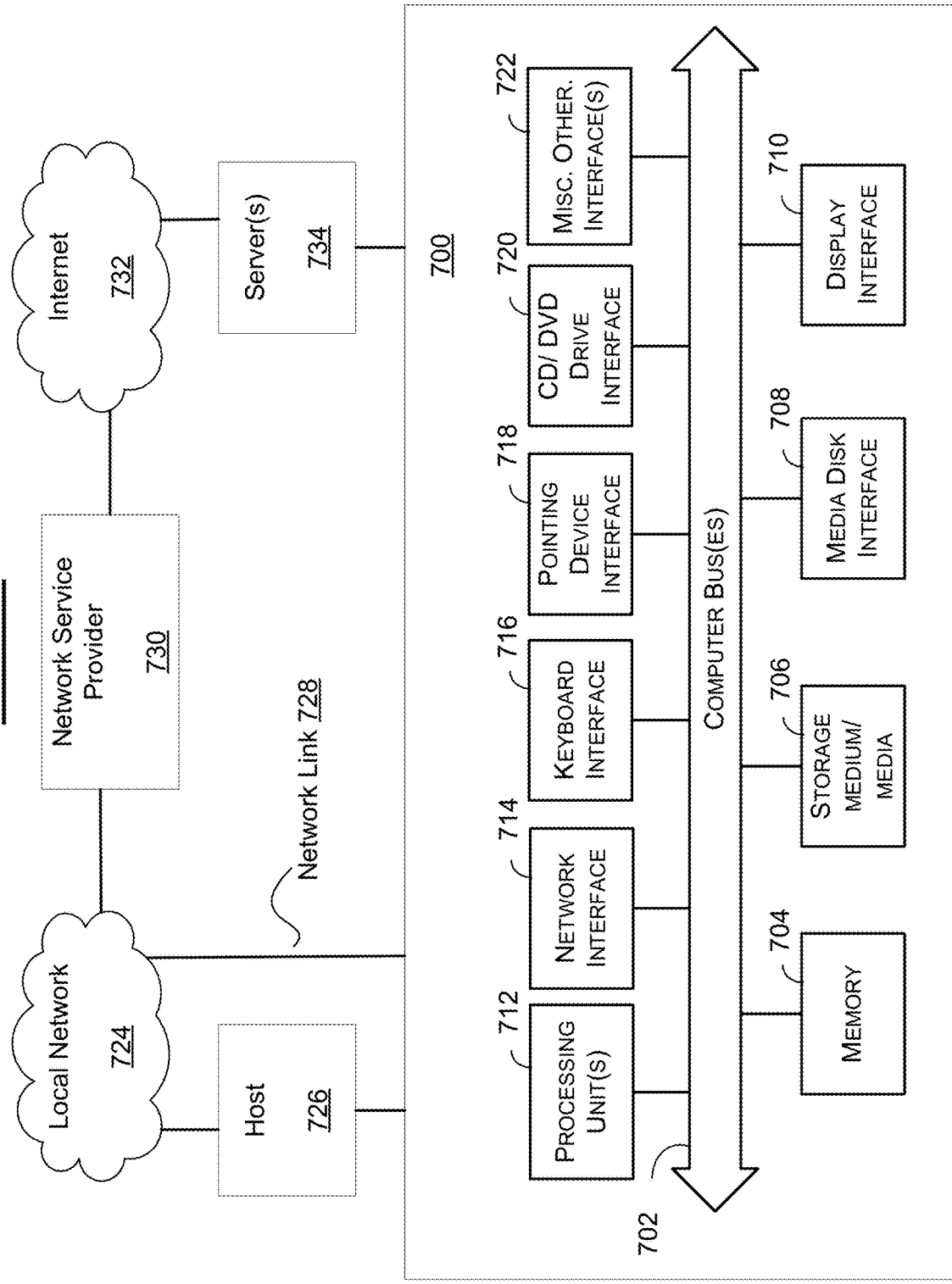
FIG. 7 is a block diagram illustrating the architecture of an exemplary hardware device in accordance with one or more embodiments of the present disclosure.

As shown in FIG. 7, internal architecture 700 of a computing device(s), computing system, computing platform, user devices, set-top box, smart TV and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

detecting, via a first application executing on a computing device of a user, application information associated with the computing device, said detection comprising analyzing registry information of said computing device, and based on said analysis, identifying said application information that comprises an identification of applications installed on the computing device and information indicating media providers associated with each detected application;

communicating, via the first application executing on the computing device, over a network, a search request for a media listing based on said detection, said search request is communicated over the network to a server associated with each identified media provider, said search request comprising an identifier of the user and said application information in order to obtain media information associated with the user from each media provider associated with each detected application;

receiving, at the computing device over the network, a search result from each media provider associated with a detected application, the search result comprising media items and media information from each media provider, the media information for each media provider indicating a user preference specifically designated by and associated with the user for each media item specifically provided by a respective media provider that is included in the search result, the user preferences corresponding to a specifically set rating individually provided by the user for each media item on each platform of the respective media providers;

analyzing, via the first application executing on the computing device, the media information from each media provider included in said search result;

determining, via the first application executing on the computing device, an order of the search result based on the user's media information received from each media provider, such that a media item's position respective to another media item's position within the search result is based on a respective user preference provided by a respective media provider;

compiling, via the first application executing on the computing device, the media items received from each media provider into an ordered media item presentation comprising each media item positioned within the ordered media item presentation based on said determined order of the search result, such that a media item's position respective to another media item's position within the ordered media item presentation is based on a respective user preference of the media item that is provided by and associated with a respective media provider of the media item;

creating, via the first application executing on the computing device, a customized user interface (UI) specific to the first application, said created customized UI corresponding to the compiled ordered media item presentation; and displaying, via the first application executing on the computing device, said media item presentation within a first portion of the customized UI, said display of the media item presentation enabling the computing device to render the media items from each media provider in said media item presentation according to the ordering of the media item presentation and interact with said media information associated with the media items.

2. The method of claim 1, further comprising:

associating a deep-linking feature with each detected application, the deep-linking feature enabling rendering of media via each detected application solely via an interaction with the first application.

3. The method of claim 2, further comprising:

receiving a selection by the user identifying media in the media item presentation;

displaying the media information related to the selected media in a second portion of the UI of the first application; and displaying in a third portion of the UI a set of buttons corresponding to the detected applications, where each button corresponds to an individual detected application, said third portion displayed in connection with said second portion.

4. The method of claim 1, wherein opening of said detected applications results in a display of individual user interfaces (UI) respective to each detected application, and said customized UI is separate and distinct from each detected application UI.

5. The method of claim 3, further comprising:

receiving a second selection by the user respective to one of the displayed buttons; and opening the application associated with the selected button via the deep-linking feature in order to render the media identified by the first selection.

6. The method of claim 1, wherein said application information detection comprises determining applications that are for rendering media content.

7. The method of claim 6, wherein said rendering of media content comprises at least one of streaming media and downloading media for playback.

8. The method of claim 1, wherein said media information obtained from the media providers is based on the user identifier.

9. The method of claim 1, further comprising:

receiving a request from the user to open the first application, wherein said determination of the application information is based on said open request.

10. A non-transitory computer-readable storage medium tangibly encoded with computer-executable instructions, that when executed by a processor associated with a computing device, performs a method comprising:

detecting, via a first application executing on the computing device of a user, application information associated with the computing device, said detection comprising analyzing registry information of said computing device, and based on said analysis, identifying said application information that comprises an identification of applications installed on the computing device and information indicating media providers associated with each detected application;

communicating, via the first application executing on the computing device, over a network, a search request for a media listing based on said detection, said search request is communicated over the network to a server associated with each identified media provider, said search request comprising an identifier of the user and said application information in order to obtain media information associated with the user from each media provider associated with each detected application;

receiving, at the computing device over the network, a search result from each media provider associated with a detected application, the search result comprising media items and media information from each media provider, the media information for each media provider indicating a user preference specifically designated by and associated with the user for each media item specifically provided by a respective media provider that is included in the search result, the user preferences corresponding to a specifically set rating individually provided by the user for each media item on each platform of the respective media providers;

analyzing, via the first application executing on the computing device, the media information from each media provider included in said search result;

determining, via the first application executing on the computing device, an order of the search result based on the user's media information received from each media provider, such that a media item's position respective to another media item's position within the search result is based on a respective user preference provided by a respective media provider;

compiling, via the first application executing on the computing device, the media items received from each media provider into an ordered media item presentation comprising each media item positioned within the ordered media item presentation based on said determined order of the search result, such that a media item's position respective to another media item's position within the ordered media item presentation is based on a respective user preference of the media item that is provided by and associated with a respective media provider of the media item;

creating, via the first application executing on the computing device, a customized user interface (UI) specific to the first application, said created customized UI corresponding to the compiled ordered media item presentation; and displaying, via the first application executing on the computing device, said media item presentation within a first portion of the customized UI, said display of the media item presentation enabling the computing device to render the media items in said media item presentation according to the ordering of the media item presentation and interact with said media information associated with the media items.

11. The non-transitory computer-readable storage medium of claim 10, further comprising:
associating a deep-linking feature with each detected application, the deep-linking feature enabling rendering of media via each detected application solely via an interaction with the first application.

12. The non-transitory computer-readable storage medium of claim 11, further comprising:
receiving a selection by the user identifying media in the media item presentation;
displaying the media information related to the selected media in a second portion of the UI of the first application; and
displaying in a third portion of the UI a set of buttons corresponding to the detected applications, where each button corresponds to an individual detected application, said third portion displayed in connection with said second portion.

13. The non-transitory computer-readable storage medium of claim 10, wherein opening of said detected applications results in a display of individual user interfaces (UI) respective to each detected application, and said customized UI is separate and distinct from each detected application UI.

14. The non-transitory computer-readable storage medium of claim 12, further comprising:
receiving a second selection by the user respective to one of the displayed buttons; and
opening the application associated with the selected button via the deep-linking feature in order to render the media identified by the first selection.

15. The non-transitory computer-readable storage medium of claim 10, wherein said application information detection comprises determining applications that are for rendering media content.

16. The non-transitory computer-readable storage medium of claim 10, wherein said media information obtained from the media providers is based on the user identifier.

17. A computing device comprising:
a processor; and
a non-transitory computer-readable storage medium for tangibly storing thereon program logic for execution by the processor, the program logic comprising:
logic executed by the processor for detecting application information associated with the computing device, said detection comprising analyzing registry information of said computing device, and based on said analysis, identifying said application information that comprises an identification of applications installed on the computing device and information indicating media providers associated with each detected application;
logic executed by the processor for communicating, over a network, a search request for a media listing based on said detection, said search request is communicated over the network to a server associated with each identified media provider, said search request comprising an identifier of a user and said application information in order to obtain media information associated with the user from each media provider associated with each detected application;
logic executed by the processor for receiving, over the network, a search result from each media provider associated with a detected application, the search result comprising media items and media information from each media provider, the media information for each media provider indicating a user preference specifically designated by and associated with the user for each media item specifically provided by a respective media provider that is included in the search result, the user preferences corresponding to a specifically set rating individually provided by the user for each media item on each platform of the respective media providers;
logic executed by the processor for analyzing the media information from each media provider included in said search result;
logic executed by the processor for determining an order of the search result based on the user's media information received from each media provider, such that a media item's position respective to another media item's position within the search result is based on a respective user preference provided by a respective media provider;

logic executed by the processor for compiling the media items received from each media provider into an ordered media item presentation comprising each media item positioned within the ordered media item presentation based on said determined order of the search result, such that a media item's position respective to another media item's position within the ordered media item presentation is based on a respective user preference of the media item that is provided by and associated with a respective media provider of the media item;

logic executed by the processor for creating a customized user interface (UI) corresponding to the compiled ordered media item presentation; and logic executed by the processor for displaying said media item presentation within a first portion of the customized UI, said display of the media item presentation enabling the computing device to render the media items in said media item presentation according to the ordering of the media item presentation and interact with said media information associated with the media items.

* * * * *